US010539042B2

(12) United States Patent
Klingels

(10) Patent No.: US 10,539,042 B2
(45) Date of Patent: Jan. 21, 2020

(54) TURBINE CENTER FRAME HAVING A CONNECTING ELEMENT

(71) Applicant: MTU Aero Engines AG, Munich (DE)

(72) Inventor: Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 101 days.

(21) Appl. No.: 15/791,911

(22) Filed: Oct. 24, 2017

(65) Prior Publication Data

US 2018/0112556 A1    Apr. 26, 2018

(30) Foreign Application Priority Data

Oct. 26, 2016    (DE) .......................... 10 2016 221 129

(51) Int. Cl.
*F01D 25/28*    (2006.01)
*F02C 7/20*    (2006.01)
*F01D 25/16*    (2006.01)

(52) U.S. Cl.
CPC ........... *F01D 25/28* (2013.01); *F01D 25/162* (2013.01); *F02C 7/20* (2013.01)

(58) Field of Classification Search
CPC ........... F01D 25/28; F01D 25/162; F02C 7/20
See application file for complete search history.

(56) References Cited

U.S. PATENT DOCUMENTS

| 5,609,467 A | 3/1997 | Lenhart et al. |
| 8,578,584 B2 | 3/2013 | Durocher et al. |
| 2007/0261411 A1* | 11/2007 | Nagendra ............. F01D 25/162 60/796 |
| 2013/0011242 A1* | 1/2013 | Beeck ..................... F01D 25/28 415/142 |
| 2013/0224010 A1* | 8/2013 | Farah .................... F01D 25/162 415/209.2 |
| 2016/0201516 A1* | 7/2016 | Bauer ..................... F01D 9/042 415/213.1 |
| 2017/0107843 A1 | 4/2017 | Humhauser et al. | |

FOREIGN PATENT DOCUMENTS

| DE | 102014215693 | 2/2016 |
| EP | 1854962 | 11/2007 |
| EP | 3045665 | 7/2016 |

(Continued)

*Primary Examiner* — Woody A Lee, Jr.
(74) *Attorney, Agent, or Firm* — Davidson, Davidson & Kappel, LLC

(57) ABSTRACT

A turbine center frame for a gas turbine, in particular an aircraft gas turbine, having a hot gas-conveying, segmented annular duct (6), a radial outer casing (4) that is disposed at a distance around the annular duct (6), a hub element (7) that is disposed radially inwardly at a distance from the annular duct (6), a plurality of struts (5) that essentially extend in the radial direction (RR) through the annular duct (6) and that are coupled radially inwardly to the hub element (7) and radially outwardly to the outer casing (4), and having at least one connecting element (30), that is formed obliquely to the struts (5), that extends through the annular duct (6), and is coupled radially inwardly to a seal carrier element (20), the seal carrier element (20) being supported axially forwardly on the hub element (7). At least one connecting element (30) is coupled radially outwardly to one of the struts (5).

13 Claims, 2 Drawing Sheets

(56) References Cited

FOREIGN PATENT DOCUMENTS

| | | |
|---|---|---|
| EP | 3048259 A1 | 7/2016 |
| EP | 3159505 | 4/2017 |
| WO | WO02014011978 A1 | 1/2014 |
| WO | WO02014052007 A1 | 4/2014 |
| WO | WO02014113034 A1 | 7/2014 |
| WO | WO02015156882 A2 | 10/2015 |

* cited by examiner

TURBINE CENTER FRAME HAVING A CONNECTING ELEMENT

This claims the benefit of German Patent Application DE 102016221129.3, filed on Oct. 26, 2016 and hereby incorporated by reference herein.

The present invention relates to a turbine center frame for a gas turbine, in particular an aircraft gas turbine, having a hot gas-conveying, segmented annular duct, a radial outer casing that is disposed at a distance around the annular duct, a hub element that is disposed radially inwardly at a distance from the annular duct, a plurality of struts that essentially extend radially through the annular duct and that are coupled radially inwardly to the hub element and radially outwardly to the outer casing, and having at least one connecting element that is formed obliquely to the struts and that extends through the annular duct and is coupled radially inwardly to a seal carrier element, the seal carrier element being supported axially forwardly on the hub element.

Directional indications, such as "axial," "radial" and "circumferential" are to be basically understood as relative to the machine axis of the gas turbine, unless otherwise explicitly or implicitly derived from the context.

BACKGROUND

A turbine center frame of this type is known from the U.S. Patent Application Publication 20130011242A1, for example, the connecting element and the struts being coupled to the outer casing, and the connecting element and the struts being adjacently disposed to intersect one another. This configuration of the connecting element leads to force being transmitted at a plurality of closely spaced points of the outer casing, thereby resulting in stresses occurring in the outer casing. Since the strut and the supporting element intersect in the area of the annular duct, the covering must have large dimensions there, respectively have a very "thick" form. This signifies a large obstacle, respectively a sizable obstruction for the gas flow, so that losses occur accordingly, in particular also with regard to the overall efficiency of the turbine.

SUMMARY OF THE INVENTION

It is an object of the present invention to provide a turbine center frame that will overcome the above-mentioned disadvantages.

The present invention provides that at least one connecting element be radially outwardly coupled to one of the struts in the case of a turbine center frame of the mentioned type. The need for further force to be introduced in the area of the outer casing is eliminated by the coupling to a respective strut. Accordingly, stresses in the outer casing may be reduced. Finally, even the structure of the outer casing is simplified in comparison to a known outer casing on which the connecting element is supported. Regarding the position of the connecting element relative to the strut in question, it should be noted that the struts essentially extend radially and do not have any or have only a small directional component in the axial direction. The connecting element extends radially and axially. Relative to the radial direction, the connecting element may be configured at an angle of approximately 30° to 60°, preferably approximately 40° to 50°.

It is also provided that a radially outer end of the connecting element be covered by the outer casing. In other words, the radially outer end of the connecting element is disposed radially within the outer casing. Thus, the connecting element is not visible from the outside.

In this regard, it is also provided that the strut in question feature a receiving portion in which the radially outer end of the connecting element is received and supported. The receiving portion may be a type of hollow thickening of the strut through which the connecting element is passed. At a radially outer region, the receiving portion may have a bearing portion where the connecting element is supported on the strut.

To ensure that the size of the flow cross-section is not reduced too much, in particular in the area of the annular duct, the connecting element and the strut in question may be axially aligned with one another. Thus, in the axial direction, the connecting element and the strut in question form a type of V-shape. When the connecting element and the strut in question are axially aligned with one another, they form elements in the annular duct that are disposed one behind the other in the direction of flow that may be simply provided with a common jacket.

Radially inwardly, the connecting element may feature at least one coupling portion that is coupled to the seal carrier element. In this context, the coupling portion may be connected to the seal carrier element by a bolt connection, in particular also by a bolt-nut connection.

To this end, it is also provided that the connecting element feature two coupling portions that are formed obliquely relative to each other, preferably in such a way that the connecting element is essentially Y-shaped. The two coupling portions may thereby be coupled to the seal carrier along the circumferential direction at different coupling sites. Forces that act on the seal carrier element may be transmitted at low stress by a connecting element, which features two coupling portions.

At the radially outer end thereof, the connecting element may feature a tensioning device, via which a prestressing force, in particular a tensile force, acting on the connecting element, is adjustable. Such a tensioning device may be constituted of a nut, for example, that is screwed onto the external thread provided on the connecting element. By the edges thereof, the nut may thereby engage on the already above mentioned bearing portion of the receiving portion of the strut.

The connecting element and the respective strut may be accommodated in the area of the annular duct in a common jacket that is formed in a respective annular duct segment. Such an annular duct segment, which features a jacket for the strut and the connecting element, is also referred to in technical language as a fairing.

The present invention also relates to a gas turbine, in particular an aircraft gas turbine having a first turbine and at least one further turbine, an above described turbine center frame being configured between the first turbine and the further turbine.

BRIEF DESCRIPTION OF THE DRAWINGS

The present invention will be explained exemplarily in the following with reference to the enclosed figures and without being limited thereto.

DETAILED DESCRIPTION

Figure 1:
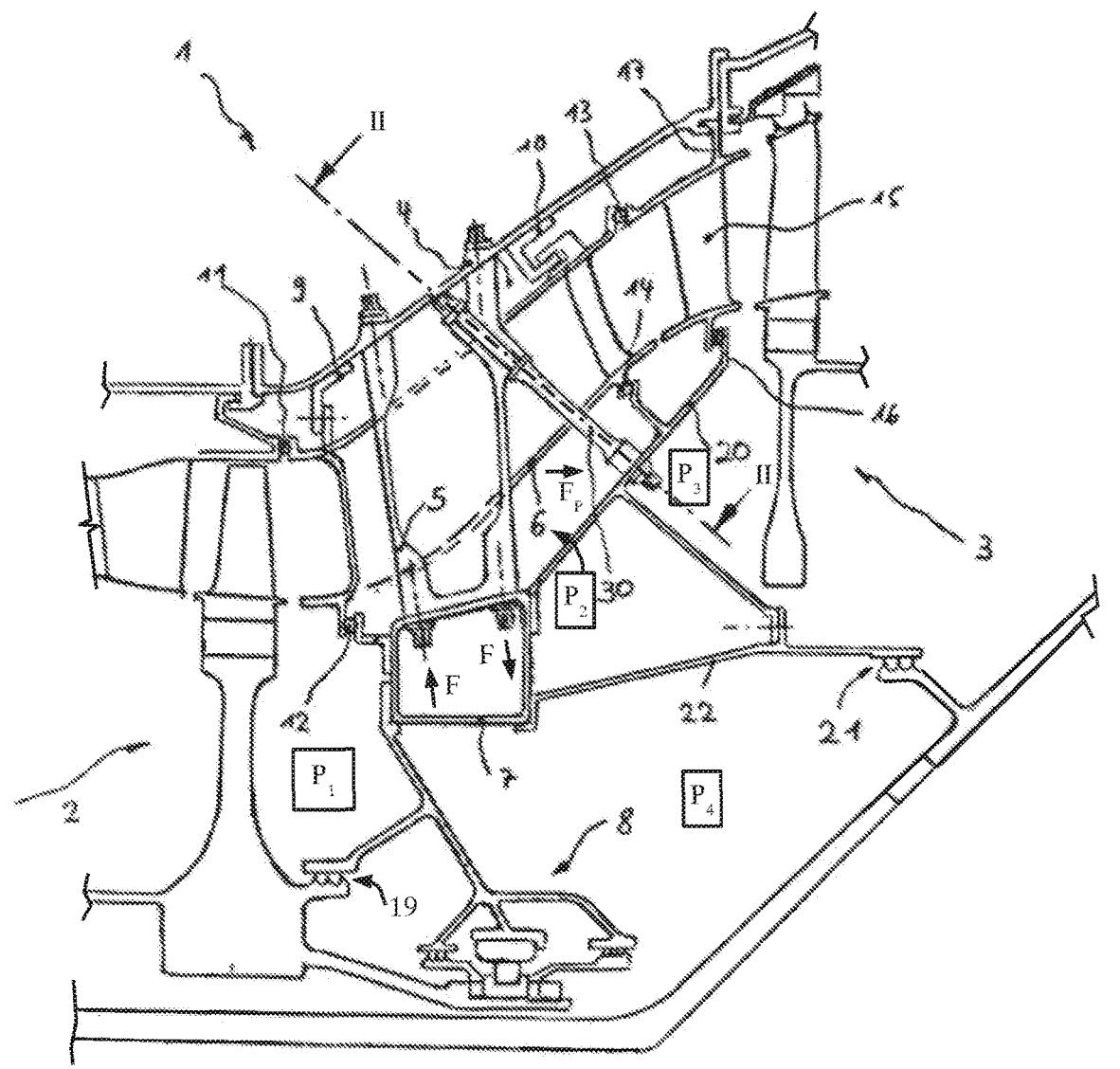
FIG. 1 shows a simplified and schematic sectional view of a specific embodiment of a turbine center frame and partly a low-pressure turbine and a high-pressure turbine.
Figure 1:
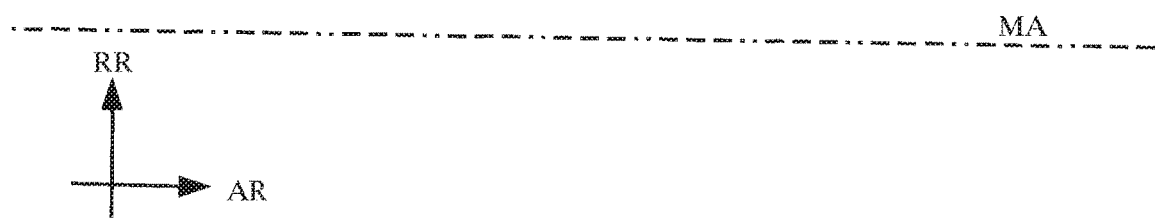

FIG. 1 shows a turbine center frame 1 of a gas turbine having a high-pressure turbine 2 (first turbine), which is upstream along axial direction AR, and a downstream low-pressure turbine 3 (further turbine). The turbine center frame features an outer casing 4 that surrounds a hot gas-conveying, segmented annular duct 6. MA designates a machine axis of the gas turbine.

A hub element 7 is provided radially inwardly. Hub element 7 and outer casing 4 are disposed concentrically to machine axis MA of the gas turbine. Hub element 7 is connected by a plurality of struts 5 to outer casing 4. Struts 5 thereby extend through hot gas-conveying, annular duct 6.

Annular duct 6 is formed, in particular, by annular duct segments that are connected by a front flow-duct attachment means 9 and a rear flow-duct attachment means 10 to outer casing 4.

Various seals 11, 12, 13 and 14 form a sealing air chamber into which sealing air is introduced at a higher pressure than the pressure prevailing in annular duct 6. This ensures that the structural members and supply lines of a bearing chamber 8 do not come in contact with hot gas.

A guide vane assembly 15 is provided axially rearwardly, upstream of the transition to low-pressure turbine 3. Guide vane assembly 15 is fixed by guide vane hooks 17 to outer casing 4. A radially inwardly provided guide vane seal 16 prevents hot gas from flowing around guide vane assembly 15.

In the illustrated example, hub element 7 is designed, in particular, as a box-shaped ring. Accordingly, box-shaped hub element 7 features a high torsional stiffness. Bearing chamber 8 having a seal carrier for a shaft seal 19 is attached to hub element 7. Also, a (guide vane) seal carrier element 20 is configured on hub element 7. A shaft seal carrier, that is also connected to hub element 7, is designated by 22.

The components mentioned above are subjected to different pressures that are indicated in FIG. 1 by P1 through P4 (enframed), where P1>P2>P3>P4. The pressures acting on the components induce resulting forces (characterized by Fp) in axial direction AR that are transmitted to hub element 7. From there, the forces are directed via struts 5 into outer casing 4. Therefore, high forces (characterized by F) arise at the transitions or connections between hub element 7 and struts 5. They may be limited in the lifetime thereof in response to cyclic loading.

Seal carrier 20 features a substantial extent, in particular in axial direction AR and radial direction RR. This leads to a large surface area upon which the pressure difference between P2 and P3, in particular, acts. To avoid substantial stresses and deformations on seal carrier 20, seal carrier 20 is also supported by a connecting element 30, in addition to being mounted on hub element 7. Seal carrier 20 is thereby supported by connecting elements 30 that are supported on a respective strut 5. It is clear that a plurality of connecting elements 30 are circumferentially spaced in order to effectively support entire seal carrier 20. A portion of the forces is not directed by connecting element 30 via hub 7 to struts 5, but rather directly via struts 5 into outer casing 4. Thus, the site where struts 5 are connected to hub 7 may be relieved of load, thereby prolonging the service life thereof. Moreover, the components in question, in particular seal carrier 20, may have a less massive, in particular more lightweight design.

Figure 2:
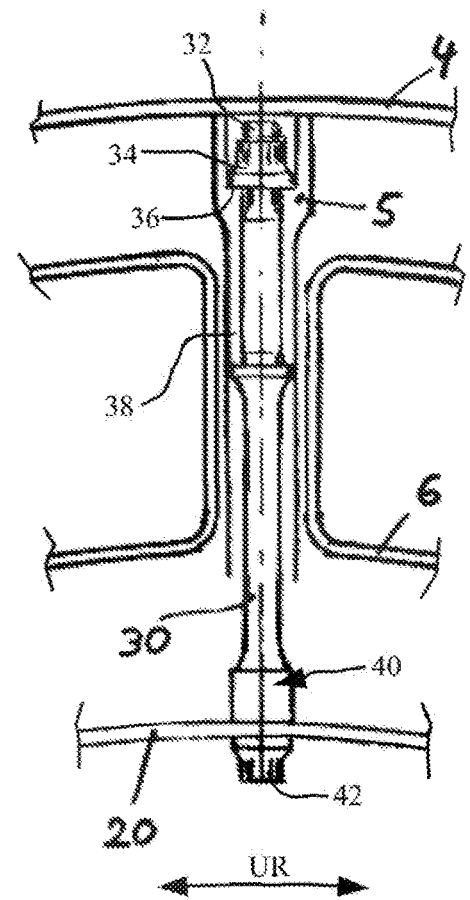
In FIGS. 2A and 2B show two specific embodiments of a connecting element in a sectional view along the line of intersection II-II of FIG. 1.
Figure 2:
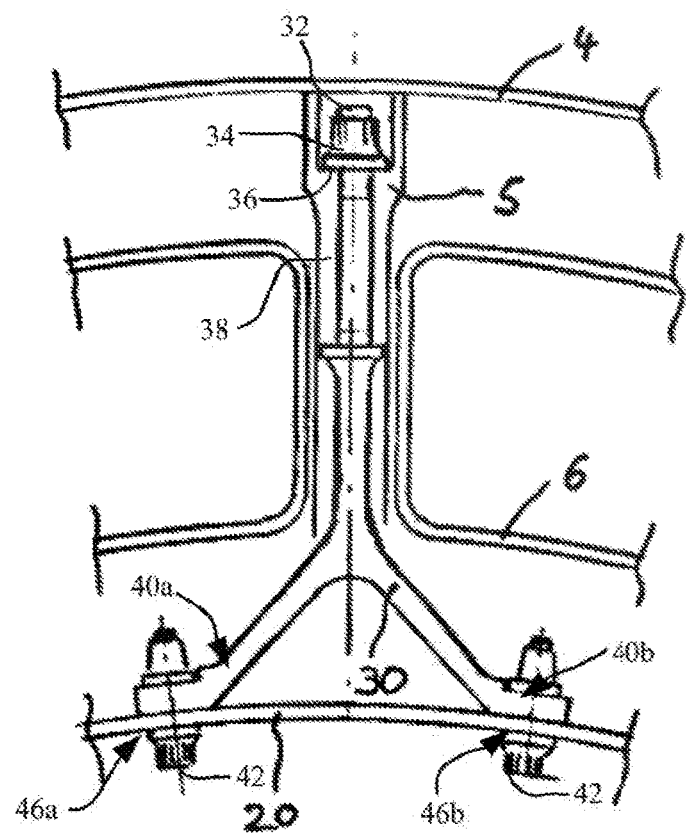

In a cross-sectional view, FIG. 2A shows a first specific embodiment of connecting element 30 along line of intersection II-II of FIG. 1. Connecting element 30 is in the form of a tie rod. Radially outwardly, connecting element 30 features a threaded portion 32 that is connected to a nut 34. By the radially inner edge thereof, nut 34 rests on a bearing portion 36 that is formed in a receiving portion 38 of strut 5. A prestressing force, in particular a tensile force, acting on connecting element 30, may be adjusted by nut 34. Thus, bolt-nut connection 32, 34 forms a type of tensioning device for connecting element 30.

At the radially inner end thereof, the connecting element 30 features a coupling portion 40. Coupling portion 40 likewise includes a threaded portion (not visible) that is connected to a nut 42. Coupling portion 40 is hereby coupled to seal carrier 20.

An alternative specific embodiment of connecting element 30 is shown in FIG. 2B). Radially outwardly, connecting element 30 has the same design as already described with reference to FIG. 2A). Radially inwardly, respectively at the radial inner end thereof, connecting element 30 has two coupling portions 40a, 40b. The two coupling portions 40a, 40b are configured obliquely relative to each other. Accordingly, connecting element 30 is coupled to seal carrier 20 at two sites 46a, 46b that are spaced apart in circumferential direction UR. In other words, connecting element 30 widens in the area underneath (radially inwardly of) annular duct 6 in a fork- or V-shape. Connecting element 30 having two coupling portions 40a, 40b makes it possible to more uniformly introduce force to the seal carrier, due to the increased number of connection sites 46a, 46b, to avoid localized stress peaks in seal carrier 20.

Overall, therefore, a turbine center frame is provided that may be used, in particular, for gas turbines having a plurality of shafts, in particular between individual turbines, such as a low-pressure turbine and a high-pressure turbine, or a low-pressure turbine and an intermediate-pressure turbine, or a high-pressure turbine and an intermediate-pressure turbine, for instance. The connecting element provided makes it possible for forces to be transmitted at low stress relative to the outer casing due to the supporting thereof on a strut in question. In addition, the strut in question and the corresponding connecting element in the annular duct do not constitute an unnecessarily enlarged obstacle because they are aligned with one another in the axial or main flow direction.

LIST OF REFERENCE NUMERALS 1 turbine center frame
2 high-pressure turbine
3 low-pressure turbine
4 outer casing
5 strut
6 annular duct segments
7 hub element
8 bearing chamber
9 front gas-duct attachment means
10 rear gas-duct attachment means
11 seal
12 seal
13 seal
14 seal
15 guide vane assembly
16 guide vane seal
17 guide vane hook
19 front shaft seal
20 (guide vane) seal carrier element
21 rear shaft seal
22 shaft seal carrier 30 connecting element
32 threaded portion
34 nut
36 bearing portion
38 receiving portion
40, 40a, 40b coupling portion
42 nut
46a, 46b fastening site for the coupling portion

What is claimed is:

1. A turbine center frame for a gas turbine comprising:
a hot gas-conveying, segmented annular duct;
a radial outer casing disposed at a distance around the annular duct;
a hub element disposed radially inwardly at a distance from the annular duct;
a plurality of struts extending essentially in a radial direction through the annular duct coupled radially inwardly to the hub element and radially outwardly to the outer casing;
a seal carrier element; and
at least one connecting element formed obliquely to the struts, the connecting element extending through the annular duct, and being coupled radially inwardly to the seal carrier element, the seal carrier element being supported axially forwardly on the hub element, the at least one connecting element coupled radially outwardly to one of the struts; a radially outer end of the connecting element being covered by the outer casing, the one strut featuring a receiving portion, a radially outer end of the connecting element received and supported in the receiving portion.

2. The turbine center frame as recited in claim 1 wherein the connecting element and the one strut are aligned with one another in an axial direction.

3. The turbine center frame as recited in claim 1 wherein, radially inwardly, the connecting element features at least one coupling portion coupled to the seal carrier element.

4. The turbine center frame as recited in claim 3 wherein the connecting element has two coupling portions formed obliquely relative to each other.

5. The turbine center frame as recited in claim 4 wherein the connecting element is Y-shaped.

6. The turbine center frame as recited in claim 4 wherein the two coupling portions are coupled to the seal carrier along a circumferential direction at different coupling sites.

7. The turbine center frame as recited in claim 1 wherein, at a radially outer end thereof, the connecting element has a tensioner, a prestressing force on the connecting element being adjustable via the tensioner.

8. The turbine center frame as recited in claim 7 wherein the prestressing force is a tensile force.

9. The turbine center frame as recited in claim 7 wherein the connecting element and the one strut are accommodated in the area of the annular duct in a common jacket formed in a respective annular duct segment.

10. A gas turbine comprising: a first turbine; at least one further turbine; and the turbine center frame as recited in claim 1 configured between the first turbine and the further turbine.

11. An aircraft gas turbine comprising the gas turbine as recited in claim 10.

12. A turbine center frame for a gas turbine comprising:
a hot gas-conveying, segmented annular duct;
a radial outer casing disposed at a distance around the annular duct;
a hub element disposed radially inwardly at a distance from the annular duct;
a plurality of struts extending essentially in a radial direction through the annular duct coupled radially inwardly to the hub element and radially outwardly to the outer casing;
a seal carrier element; and
at least one connecting element formed obliquely to the struts, the connecting element extending through the annular duct, and being coupled radially inwardly to the seal carrier element, the seal carrier element being supported axially forwardly on the hub element, the at least one connecting element coupled radially outwardly to one of the struts, the connecting element having two coupling portions formed obliquely relative to each other and coupled to the seal carrier along a circumferential direction at different coupling sites.

13. A turbine center frame for a gas turbine comprising:
a hot gas-conveying, segmented annular duct;
a radial outer casing disposed at a distance around the annular duct;
a hub element disposed radially inwardly at a distance from the annular duct;
a plurality of struts extending essentially in a radial direction through the annular duct coupled radially inwardly to the hub element and radially outwardly to the outer casing;
a seal carrier element; and
at least one connecting element formed obliquely to the struts, the connecting element extending through the annular duct, and being coupled radially inwardly to the seal carrier element, the seal carrier element being supported in axial and radial directions on the hub element, the at least one connecting element coupled radially outwardly on one of the struts so that the seal carrier element is supported on the one strut via the at least one connecting element.

* * * * *